Patented Jan. 2, 1951

2,536,680

UNITED STATES PATENT OFFICE 2,536,680

CATALYSTS AND PROCESS FOR THE PRODUCTION OF CARBON DISULFIDE BY REACTION OF HYDROCARBONS AND SULFUR VAPOR

Hillis O. Folkins, Crystal Lake, and Elmer Miller, Evanston, Ill., assignors to The Pure Oil Company, Chicago, Ill., a corporation of Ohio No Drawing. Application November 10, 1949, Serial No. 126,706

10 Claims. (Cl. 23—206)

This invention relates to a method of producing carbon disulfide and, in particular, to a catalytic process in which a hydrocarbon gas consisting principally of methane, is used as the source of carbon and hydrogen sulfide or sulfur represents the second reactant.

Reaction between carbon and sulfur or between the hydrocarbon and sulfur to form carbon disulfide is known in processes to some extent, even in the absence of any catalysts. The traditional method of making carbon disulfide is to pass sulfur vapor over heated carbon, thereby to induce carbon disulfide formation. In the absence of a catalyst, extremely high temperatures of the order of 800° to 1000° C., are required to obtain commercial yields of carbon disulfide.

Accordingly, it is an object of our invention to provide an improved catalytic method of producing carbon disulfide wherein certain improved catalysts can be used to cause the reaction to proceed rapidly at lower temperatures.

It is another object of our invention to provide an improved catalyst which, under any reaction conditions in which sulfur or hydrogen sulfide will react with a hydrocarbon to form carbon disulfide, will effect a very material amount of conversion.

Other objects and advantages of our invention will in part be obvious and in part appear hereinafter.

Though it is known that many solid contact materials have a catalytic effect upon the hydrocarbon-sulfur reaction, there are vast numbers which do not have such an effect. For example, typical solid contact agents which promote the reaction are those disclosed in United States Patent 2,330,934, and include such catalysts as silica gel, fuller's earth, bauxite and activated alumina. The extension or enlargement of the group of useful catalysts for the process does not follow any logical or consistent rule, for it has been found that elements closely related in substantially all properties and in their chemical and physical nature, as well as position in the periodic system, result in the production in one case of an active material, and in the other case of an inactive one.

We have discovered that high yields of carbon disulfide can be obtained by reacting hydrocarbons with sulfur in the presence of certain metal phosphate catalysts, supported or alone, consisting essentially of the phosphates of copper, zirconium and thorium, under the conditions outlined, contact of the catalyst with hydrocarbon gas and sulfur being at a temperature in the range from about 450° to 700° C. and preferably about 550° to 650° C.

In accordance with the invention, therefor, sulfur and hydrocarbons, such as methane, ethane, propane, butane, or any mixture thereof, and mixtures of these hydrocarbons with olefinic hydrocarbon gases, such as refinery residual gases containing ethylene, propylene, or butylene, are preheated to a temperature approximating the desired reaction temperature, or to a level somewhat higher, which preheating temperature will be in the range from about 450° to 700° C., and preferably would be about 600° to 700° C. The hydrocarbon and the sulfur and may be separately preheated and then mixed. The preheated mixture of hydrocarbon and sulfur is then charged to a reaction zone enclosing a body of the metal phosphate catalyst which may be granular, pelleted, or other convenient comminuted form. Following a period of contact in the reaction zone corresponding to a space velocity of 100 to 5000, the reactant gases are withdrawn and passed to a recovery system which involves cooling the gases to condense out the carbon disulfide, or utilizing an absorption system in which the reaction gases are passed through an oil which scrubs out the carbon disulfide formed in the reaction.

Useful catalysts conforming to the invention may be made by precipitation of the catalyst metal phosphate from an aqueous solution or by precipitation of the catalyst metal phosphate on a support, or, further, by coprecipitation of the catalyst metal phosphate and a support. When supported catalysts are employed, a convenient procedure is to deposite the phosphate on an active or inactive support commercially obtained, such as silica gel, activated alumina, synthetic silica-alumina, fuller's earth, or pumice. The support or carrier may or may not be an active catalyst for the carbon disulfide reaction. In general, about 5 per cent of the catalyst composition on the support is adequate to make it useful, but larger amounts, varying to 25 per cent, can be used. Where the catalyst is desired as a supported one, it is best made by saturating the support with the theoretical amount of the catalyst metal compound, evaporating the solution and igniting or activating in such manner as appears to fit the particular composition. As specific examples of the preparation of suitable catalysts, the following are given:

*Example 1.*—Zirconyl chloride in aqueous solution was made up in a quantity sufficient to give the desired amount of catalyst and the phosphate precipitated by adding thereto an aqueous solution of ammonium dihydrogen phosphate. The zirconium phosphate, being insoluble, was filtered off, dried and used as such. It is possible to mix it with pelleting ingredients in order to form pellets of controlled size for convenience in handling, but the plain compound is satisfactory for general use.

*Example 2.*—Following a similar procedure as that which was used in the preparation of the zirconium phosphate, a solution of thorium nitrate was treated with phosphoric acid and the insoluble thorium phosphate was filtered off, dried and used as a catalyst.

*Example 3.*—In similar fashion, the needed amount of copper phosphate can be precipitated from copper nitrate or copper sulfate solution with ammonium phosphate, recovered, dried and activated.

Where it is desired to use a supported catalyst, the customary practice in the preparation of such compositions can be followed by making up the solution of the catalyst metal salt, soaking the carrier therewith, then precipitating the catalyst metal compound on the carrier by treating the soaked carrier with the precipitating agent. Thus, in the preparation of supported zirconium phosphate, a silica gel or activated alumina support is saturated in the zirconyl chloride solution, filtered off, and then soaked in an ammonium dihydrogen phosphate solution to precipitate the zirconium phosphate in situ.

The process for preparing carbon disulfide follows substantially known manipulative techniques in that it can be carried out at any absolute pressure up into ranges greatly in excess of atmospheric. Generally, it has been found advantageous to employ reaction pressures somewhat higher than atmospheric in order to charge the reaction products through the remainder of the apparatus without the necessity of compressing gases, and for the purpose of increasing residence time of reactants in the reaction zone under conditions of constant catalyst volume. Optimum contact between the catalyst and reactant is effected by passing the reactants through a stationary bed of granular or pelleted catalyst. Similarly, the reactants may be passed through a moving bed of granular or pelleted catalyst, or by intimately mixing the reactant with powdered catalyst which remains suspended in the reaction mixture during its passage through the reaction zone and is subsequently removed from the reaction products by appropriate precipitating devices. However, since the catalysts remain active for almost indefinite periods of time, the stationary bed-type of process is simplest and most economical. It will be observed that the several means mentioned for contacting the reaction gases with catalysts are the common methods of contacting hydrocarbon gases with catalysts used in the petroleum processing industry.

The time of contact between the reactants and catalyst, or the space velocity, is determined principally by the temperature at which the reaction is carried out. In the neighborhood of 700° C., space velocities will preferably be high because the reaction progresses rapidly at these temperatures. At temperatures in the lower reaches of the range, space velocities can be set lower in order to increase percentage conversion since, in this reaction, conversion increases with decrease in space velocity under given conditions of operating temperature.

Space velocity in this application has the standard definition of being the total volume of reaction gas (sulfur taken as $S_2$ modification) measured at 0° C. and 760 millimeters of mercury pressure, passing through a unit volume of catalyst per hour. For purposes of the carbon disulfide synthesis as described in the instant process, best results are obtained at space velocities of approximately 250 to 700, although it is understood that different space velocities from 100 to 5000 can be used.

Though the sulfur and hydrocarbons to be reacted are preferably mixed in a ratio closely approximating the stoichiometric ratio required to form hydrogen sulfide and carbon disulfide, any desired ratio can be used, for the excess gases are recovered and reprocessed. For obtaining the best conversion of a hydrocarbon to carbon disulfide, a small excess of the order of 10 to 15 per cent of sulfur may be used in the reaction mixture. Excess sulfur present in the reaction products can be readily recovered and recycled to the process.

The reaction may be carried out isothermally or adiabatically depending upon the condition of the reaction employed. The product is separated into its components by cooling it to a temperature below the vaporization point of sulfur, but above the boiling point of carbon disulfide under the existing pressure in order to condense any residual sulfur. Thus, the recovery gases are cooled to around 140° C. in a sulfur-gas separator and the unreacted liquid sulfur is withdrawn and recirculated to the charge. Cooling of the recovery gases to about 140° C. will maintain the molten sulfur in a mobile condition. The separation of carbon disulfide from hydrogen sulfide and unreacted hydrocarbons is accomplished by absorption in a scrubbing oil, such as kerosene or a light gas oil fraction, and recovery by stripping the carbon disulfide from the absorbent oil.

Hydrogen sulfide and hydrocarbons which are absorbed in the oil with the carbon disulfide may be separated from it by distillation and recycled to the absorption process to avoid loss of carbon disulfide which may be contained therein. Recovery of carbon disulfide from reaction products is effected in accordance with the method described in United States Patent 2,330,934. The final purification of carbon disulfide to separate traces of hydrogen sulfide and other sulfur impurities therefrom can be accomplished by fractional distillation or by chemical methods.

The following table summarizes some of the results obtained with typical catalysts in the group defined in this application:

Table

| Catalyst | Space Velocity | Ratio of $S_2$ to HC | Per Cent Conversion of HC to $SC_2$ | |
|---|---|---|---|---|
| | | | 550° C. | 600° C. |
| None | 400 | 2.00 | 1.0 | 6.0 |
| $3ZrO_2.2P_2O_5$ | 403 | 2.00 | 26.2 | |
| | 371 | 1.78 | | 69.2 |
| | 275 | 2.08 | | 76.2 |
| $3ThO_2.2P_2O_5$ | 745 | 2.07 | 27.8 | |
| | 736 | 2.14 | | 49.1 |
| $3CuO.P_2O_5$ | 492 | 1.85 | 9.3 | |
| | 497 | 1.90 | | 49.6 |

Methane and natural gas containing a high proportion of methane in accordance with our application Serial Number 754,776 was used as the reaction gas in each case. In the majority of cases, the stoichiometric amount of sulfur within experimental limitations was used, as will be observed from the column in the table.

The data indicate that zirconium and thorium phosphates constitute good catalyst per se and promote the reaction between hydrocarbon gases and sulfur vapor to a substantial extent as measured by the amount of conversion in the temperature range from about 550° to 600° C., which is about the commercial operating range. In the lower portion of the range, at about 550°, it will be observed that zirconium phosphate at comparable space velocity is a twenty-five fold improvement over the thermal reaction. Similarly, thorium phosphate, when the reaction rate is reduced to a space velocity comparable to the figure given for the uncatalyzed reaction, will give an improvement approximately fifty-fold. At 600° C., the amount of conversion measured in terms of hydrocarbon converted to carbon disulfide is also much greater than conversion obtained in the purely thermal reaction.

Although the process has been described with a limited number of examples, the catalysts should be considered as the metal salts mentioned of any oxygen acid of phosphorus, and that the particular phosphate radical used is the one stable under the conditions of operation.

The examples of the instant process given in the preceding paragraphs are to be considered illustrative and not as limitations thereof.

What is claimed is:

1. The method of preparing carbon disulfide comprising, contacting a mixture of sulfur and hydrocarbon with a catalyst selected from the group consisting of copper, zirconium and thorium phosphates at a temperature of approximately 450° to 700° C.

2. Method in accordance with claim 1 in which the catalyst is deposited on a carrier.

3. Method in accordance with claim 1 in which the catalyst is zirconium phosphate.

4. Method in accordance with claim 1 in which the catalyst is thorium phosphate.

5. Method in accordance with claim 1 in which the catalyst is copper phosphate.

6. The method of preparing carbon disulfide comprising, contacting hydrocarbon gas rich in methane with sulfur in an amount at least equal to approximately the stoichiometric quantity required for formation of carbon disulfide in contact with a catalyst selected from the group consisting of copper, zirconium and thorium phosphates at a temperature of approximately 550° to 650° C.

7. Method in accordance with claim 6 in which the catalyst is deposited on a carrier.

8. Method in accordance with claim 6 in which the catalyst is zirconium phosphate and the temperature is about 550° to 650° C.

9. Method in accordance with claim 6 in which the catalyst is thorium phosphate and the temperature is 550° to 650° C.

10. Method in accordance with claim 6 in which the catalyst is copper phosphate and the temperature is 550° to 650° C.

HILLIS O. FOLKINS.
ELMER MILLER.

No references cited.